United States Patent [19]
Urata

[11] 4,429,380
[45] Jan. 31, 1984

[54] BRAKING DEVICE FOR A PICKUP ARM OF A DISK PLAYER OR THE LIKE

[75] Inventor: Kazuo Urata, Hamakita, Japan

[73] Assignee: Nippon Gakki Seizo Kabushiki Kaisha, Japan

[21] Appl. No.: 305,363

[22] Filed: Sep. 24, 1981

[30] Foreign Application Priority Data

Dec. 29, 1980 [JP] Japan ............................. 55-187937[U]

[51] Int. Cl.³ .......................................... G11B 17/06
[52] U.S. Cl. ................................... 369/230; 369/252
[58] Field of Search .............. 369/244, 245, 225, 230, 369/255, 251, 224, 252, 253, 254, 216, 215, 56, 57

[56] References Cited

U.S. PATENT DOCUMENTS

| | | | |
|---|---|---|---|
| 1,872,366 | 8/1932 | Van Dyck | 369/230 |
| 2,972,483 | 2/1961 | Rodgers | 369/57 |
| 4,143,879 | 3/1979 | Wien | 369/245 |
| 4,344,163 | 8/1982 | Madalinski | 369/245 |
| 4,356,560 | 10/1982 | Ohnishi | 369/246 |

*Primary Examiner*—Steven L. Stephan
*Attorney, Agent, or Firm*—Kane, Dalsimer, Kane, Sullivan and Kurucz

[57] ABSTRACT

A braking device for providing a braking action to the horizontal swinging movement of a pickup arm of a record player and the like. The device comprises a brake for applying the braking action and an actuator for actuating the brake, when the pickup arm is in a non-playing mode, to provide the braking action.

6 Claims, 3 Drawing Figures

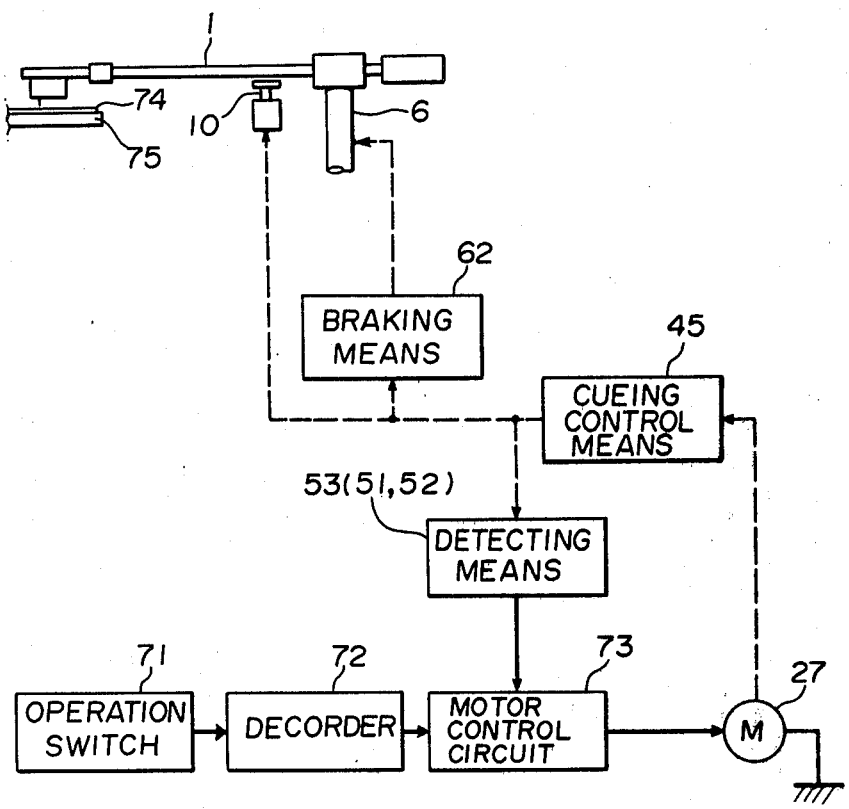

BRAKING DEVICE FOR A PICKUP ARM OF A DISK PLAYER OR THE LIKE

BACKGROUND OF THE INVENTION

The present invention relates to a braking device for a pickup arm of a disc player, i.e., a phonograph record player, a video disc player or the like.

Conventionally, a pickup arm of a phonograph record player is pivotally supported for horizontal and vertical swings about its pivoted end so that a stylus of a pickup cartridge carried on the other end thereof can track the groove of a record disc. The pickup arm is raised or lowered by means of an arm lifter. Such pickup arm has a problem that an accidental horizontal swing movement of the arm occurs when the arm is away from the record disc or in a non-playing mode since the pickup arm is always capable of swinging horizontally. More specifically, the pickup arm in most cases is subjected to a counterforce exerted by electric leads or external forces by an inside-force-canceller, etc. These forces, if acting on the pickup arm during its vertical movement toward and away from the record disc, can make it impossible to raise or lower the arm to a predetermined position, causing starting of the record playing at an undesired position of the record disc. Furthermore, when the record playing is discontinued and then the pickup arm is in a pause position or upper limit position where the pickup arm rests on the arm lifter, another problem is encountered in that the pickup arm is easily displaced by inadvertently touching the pickup arm. Such is the case with the video disc player.

The known simple method for suppressing such a superfluous horizontal movement is to provide a damping member to the upper surface of the arm lifter. The method is, however, not sufficient to prevent the horizontal movement, for example, when the pickup arm is touched inadvertently.

SUMMARY OF THE INVENTION

It is accordingly a primary object of the invention to provide a braking device for a pickup arm of a disc player which can eliminate the above disadvantages, whereby accurate positioning of a stylus of a pickup cartridge on a record disc surface can be made.

This and other objects are achieved by a braking device for a pickup arm of a disc player of the type including a frame, a turntable rotatably mounted on the frame, and a pickup arm supported on the frame for vertical and horizontal movements relative to the turntable, comprising: braking means for applying a braking action; and means for actuating the braking means, when the pickup arm is in a non-playing mode, to apply the braking action to the horizontal movement of the pickup arm.

BRIEF DESCRIPTION OF THE DRAWINGS

FIG. 3 is a block diagram illustrating the relation between a mechanical system and an electrical system of the braking device in FIG. 1.

DETAILED DESCRIPTION OF THE PREFERRED EMBODIMENTS

Figure 1:
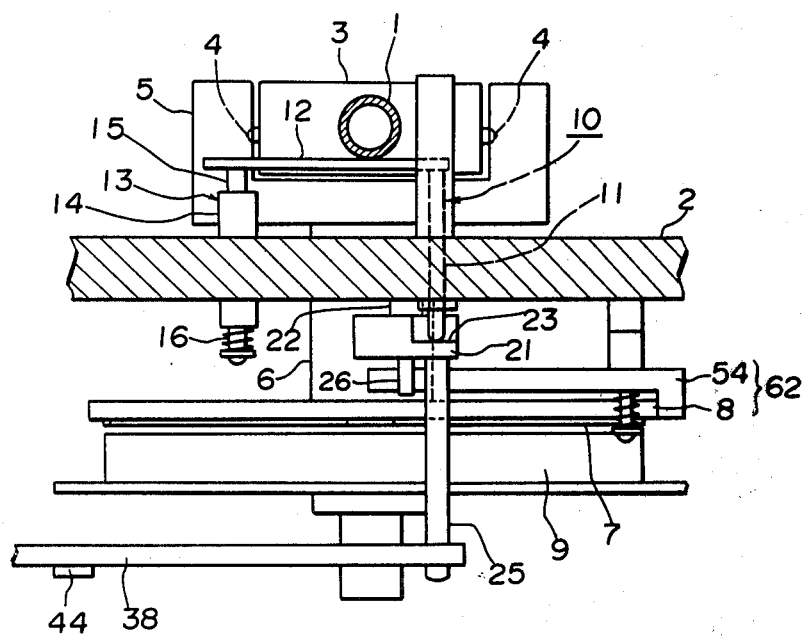
FIG. 1 is a front view, partly in section, of a pickup arm incorporating the braking device according to the present invention.

Referring now to FIG. 1, reference numeral 1 designates a pickup arm of a record player fixed at its proximal end to a first supporting member 3, which is pivotally attached for vertical swing movement on a pair of vertical pivots 4 to a second supporting member 5, which is in turn secured at its lower surface to a main shaft 6. The main shaft 6 is mounted perpendicularly to the base plate or a frame 2 for rotation about its axis. In this arrangement, the arm 1 is capable of vertically swinging about the pivots 4 and horizontally swinging about the main shaft 6. Fixedly secured to the lower end of the main shaft 6 which projects downwardly of the base plate 2 is a coil support 8, the lower surface of which has a coil 7 bonded thereto. A magnet 9 is disposed below the coil support 8 to face the coil 7. The coil support 8 with the coil 7 and the magnet 9 constitute means for horizontally moving the pickup arm to rotate the main shaft 6 and being supplied with a predetermined level of current to the coil 7, the pickup arm 1 moves horizontally to perform lead-in and return operation of the arm manually or automatically. The coil support 8 of a disc shape partially cut is fixedly attached at its center portion to the main shaft 6 as shown in FIG. 2, and also serves as a brake drum or braking force applied member.

A pickup arm lifter 10 is mounted to the base plate 2 in such a manner that the lifter is positioned below the arm 1. The pickup arm lifter 10 has a rod 11 movably passing through the base plate 2, and a pickup arm cradle 12 attached at its one end to the top end of the rod 11. The pickup arm 1 which rests on the cradle 12 is raised or lowered by vertical movement of the rod 11. The arm lifter 10 is provided with a damper device 13 which provides damping to the vertical movement of the rod 11 and the cradle 12. The damper device 13 comprises an oil damp cylinder 14 mounted on the base plate 2, a piston rod 15 passing through the cylinder 14 and fixedly secured at its upper end to the cradle 12, and a spring 16 urging the piston rod 15 downwards, thereby urging the arm lifter 10 downwards.

Figure 2:
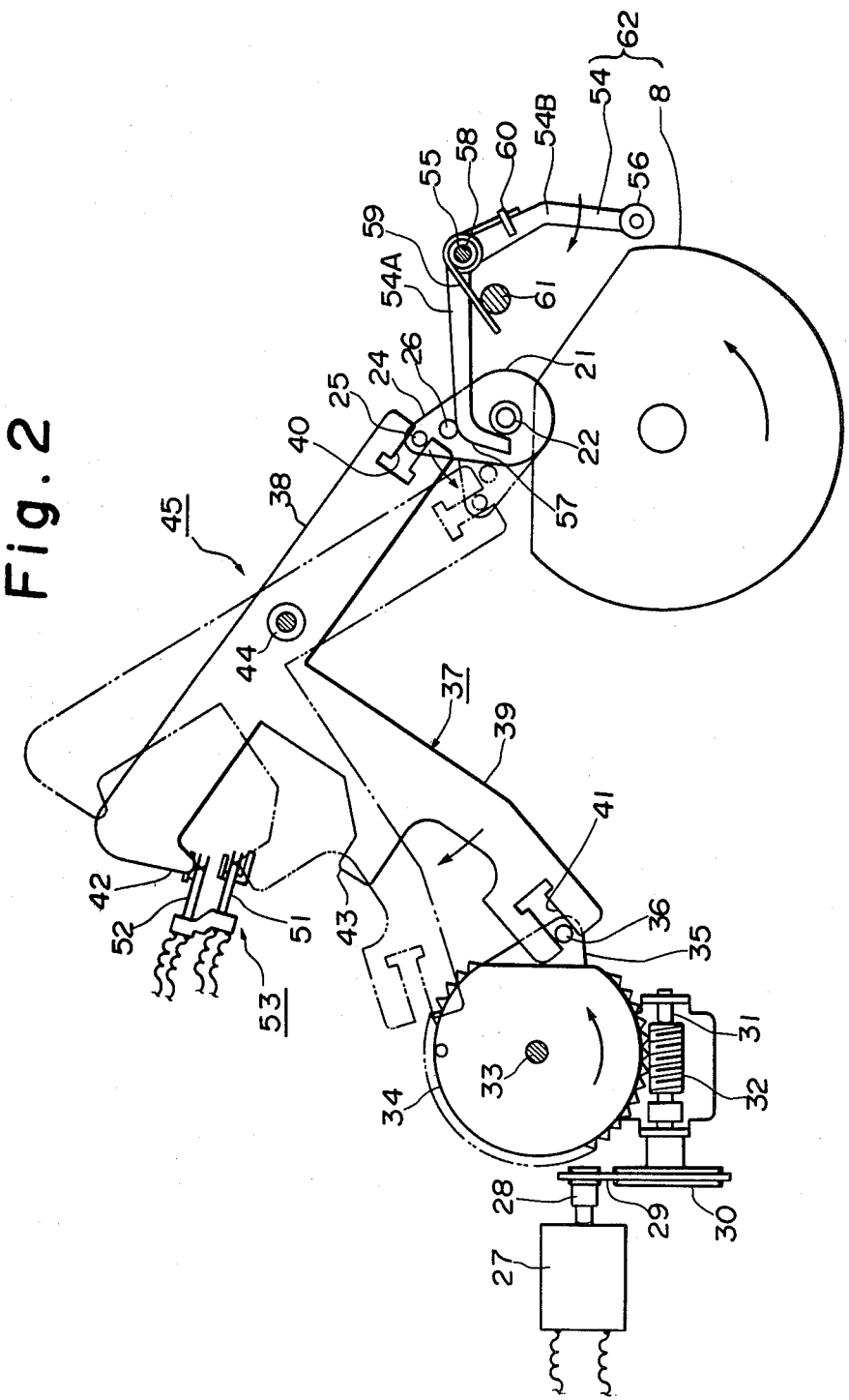
FIG. 2 is a bottom view of the braking device in FIG. 1.

As illustrated in FIGS. 1 and 2, the rod 11 of the arm lifter 10 is moved vertically by a cueing cam 21 as a first cam means disposed adjacent to the coil support 8 and below the base plate 2. The cueing cam 21 is rotatably mounted on a shaft 22 fixed to the base plate 2, and has a cam surface 23 formed in and inclined with respect to the upper surface thereof. The lower end of the rod 11 abuts against and follows the cam surface 23 so that the rod 11 moves vertically when the cueing cam 21 is rotated. Sidewardly protruding from the cueing cam 21 is a protrusion 24 which has upright pins 25 and 26 mounted on the lower surface thereof. On one side of the coil support 8 and cueing cam 21 there is provided an electric motor 27 which serves as a driving means for rotating the cueing cam 21, and the rotation of which is transmitted via pully 28, belt 29, and pully 30 to a shaft 31 of a worm 32, which engages a worm wheel 34 rotatably supported on a fixed shaft 33. The worm wheel 34 has a projection 35 formed at the periphery thereof which projection has a pin 36 mounted thereon. Between the worm wheel 34 and the cueing cam 21 there is provided a generally-T-shaped cueing lever 37 having a two-arm lever 38 and an additional arm 39 integrally formed with the middle portion of the two-arm lever 38 and extending perpendicularly thereto. The two-arm lever 38 has a slit 40 formed in the free end of one arm and a projection 42 projecting from the free end of the other arm. The arm 39 has a slit 41 formed in the free end thereof and a projection 43 projecting from the middle portion thereof. The cueing lever 37 is pivotally mounted at its central portion on a fixed shaft 44, having the pin 25 of the cueing cam 21 fitted in the slit 40 and the pin 36 of the worm wheel 34 fitted in the slit 41.

In the above arrangement, the arm lifter 10 is raised or lowered according to interlocked movement of the worm wheel 34, cueing lever 37, and cueing cam 21 when the motor 27 is rotated, as will be described in detail later. The cueing lever 37, cueing cam 21, arm lifter 10 and driving means including motor 27 constitute cueing control means or actuating means 45. The position of each member in FIG. 2 indicated by a solid line represents that the cueing control means is in a state where the pickup arm is in a lower limit position or a stylus of a pickup cartiridge carried on the pickup arm is in contact with a record disc, and the position indicated by the two-dot-chain line represents that the cueing control means is in another state where the pickup arm is in an upper limit position or uplifted position. Between the projections 42 and 43 there are disposed detecting switches 51 and 52 which are capable of detecting by respectively coming into contact with the projections 43 and 42 that the cueing lever 37 reaches a predetermined position corresponding to either the upper limit position or lower limit position of the pickup arm. These detecting switches 51 and 52 respectively output upper and lower limit detection signals to a motor control circuit which will be described later, constituting means for detecting the upper and lower limit positions 53.

Disposed adjacent to the coil support 8 and the cueing cam 21 is a brake lever 54 of a bell crank shape, at the center portion of which a bearing 55 of a cylindrical shape is formed and is pivotally mounted on a fixed shaft 58 provided to the base plate 2. The brake lever 54 has an inwardly-curved portion or a cam follower 57 formed at the free end of one arm 54A and a ring-shaped brake shoe 56 provided at the free end of the other arm 54B. Around the bearing 55 extends a brake spring 59 one end of which engages with a lug 60 formed at the arm 54B and the other end of which engages with a stud 61 mounted on the base plate 2, so that the brake arm 54 is urged to rotate in a clockwise direction in FIG. 2, with the outer surface of the curved portion 57 abutted against the pin 26 and the brake shoe 56 slightly spaced away from the periphery of the coil support 8. The curved portion 57 and the pin 26 constitutes a second cam means. The position of the brake arm 54 in FIG. 2 indicates that the pickup arm is in the lower limit position. When the cueing cam 21 is rotated as will be described later, the brake lever 54 applies a frictional force to the coil support 8 by pressing the brake shoe 56 against the periphery of the support 8, thereby providing a resistance to the rotation of the pickup arm 1, and thus the brake lever constitutes a braking means 62 in combination with the coil support disc 8.

FIG. 3 is a block diagram illustrating the relation between the above-mentioned mechanical system for controlling the pickup arm in FIGS. 1 and 2 and electric circuits controlling the system. A reference numeral 71 represents an operation switch outputting a signal for raising or lowering the pickup arm 1, which signal is inputted through a decoder 72 into a conventional motor control circuit 73 as means for controlling the drive means, which in turn starts or stops the motor 27 according to either the inputted signal from the decoder 72 or a signal from the upper and lower limit position detecting means 53.

In operation, when the record player is in a record playing mode or a stylus of the pickup cartridge is in contact with a record disc 74 on a turntable 75 rotatably mounted on the base plate 2, the pickup arm 1 and the arm lifter 10 are in the lower limit position and thus each member of cueing control means 45 and braking means 62 is in the position indicated by the solid line in FIG. 2. In this state, the proximal portion of the curved portion 57 of the brake lever 54 is abutted against the pin 26 of the cueing cam 21 by the spring 59, with the brake shoe 56 kept spaced away from the periphery of the coil support 8. The pickup arm 1 is therefore horizontally rotatable without being subjected to any resistance from the braking means 62. Suppose the pickup arm 1 is lifted to effect a pause operation for discontinuing the record playing. To perform this operation, the switch 71 is activated to provide a signal to lift the arm 1 via the decoder 72 to the motor control circuit 73, which according to the signal rotates the motor 27 in a direction to rotate the worm wheel 34 in a counterclockwise direction indicated by an arrow in FIG. 2, which causes the cueing lever 37 to rotate in a clockwise direction by the pin 36 fitted in the slit 41. The clockwise rotation of the cueing lever makes the cueing cam 21 rotate in a counterclockwise direction through the pin 25 engaging with the slit 40, which causes the rod 11 of the arm lifter 10 to be lifted according to the movement of the cam surface 23, thereby raising the pickup arm 1 supported on the cradle 12 of the lifter 10. On the other hand, this rotation of the cueing cam 21 results in the counterclockwise movement of the pin 26 about the fixed shaft 22, which causes the brake lever 54 to rotate in a clockwise direction. More specifically, during this movement of the pin 26, the curved portion 57 of the brake lever 54 follows the pin 26 under the force of the brake spring 59 and in this way the brake lever rotates clockwise. consequently, the brake shoe 56 comes into contact with the periphery of the coil support 8 under the spring force to give a braking force or a frictional force to the coil support 8, so that resistance is given to the rotation of the pickup arm 1 and an accidental horizontal movement of the arm is prevented or at least reduced. When the cueing lever 37 and the cueing cam 21 reach the respective positions indicated by the two-dot chain line, the pickup arm 1 is in a pause position or the upper limit position. Simultaneously, the projection 43 comes into contact with the detecting switch 51, which supplies an upper limit position detection signal to the motor control circuit 73, which in turn stops the rotation of the motor 27 according to the detection signal, so that the elevation of the pick up arm 1 is stopped.

To lower the pickup arm 1 for restarting the record playing from the above state, the switch 71 is again activated to provide a control signal for lowering the arm via the decoder 72 to the motor control circuit 73. The motor control circuit 73 rotates the motor 27 in a direction reverse to the previously-stated rotation, causing the worm wheel 34 to rotate clockwise, which in turn causes the cueing lever 37 to rotate counterclockwise, resulting in a clockwise rotation of the cueing cam 21. Thus, the arm lifter 10 which follows the cam surface 23 of the cueing cam 21 decends, so that the pickup arm 1 is lowered onto the record disc and then record playing is restarted. When the pickup arm 1 reaches the lower limit position, the projection 42 of the cueing lever 37 comes into contact with the detecting switch 52, which supplies a limit position detection signal to the motor control circuit 73, which in turn stops the motor 27, so that the lowering of the arm lifter 10 is stopped. During this operation, the cueing cam 21 rotates clockwise on the contrary to the previously-stated operation and the curved portion 57 follows the movement of the pin 26 of the cam 21, and thus the brake lever 54 rotates counterclockwise, so that the brake shoe 56 is spaced away from the periphery of the coiled support 8. Thus, all the members of the cueing control means 45 and the brake means 62 are brought back to their original positions, and the record playing is performed without receiving any resistance from the braking means 62.

As seen from the foregoing description, the brake means 62 applies resistance to the horizontal swing movement of the pickup arm 1 when the pickup arm is vertically moved or in the pause position, that is, the pickup arm is in the non-playing mode. The accidental rotation of the pickup arm is therefore prevented or at least minimized except when the pickup arm is in the lower limit position or in the playing mode. Furthermore, the braking means 62 does not exercise any adverse effect on the lead-in and lead-out operation of the pickup arm 1 by manually operating the arm by a hand to move horizontally, providing that the braking force of the brake shoe 56 which abuts against the periphery of the coil support 8 is appropriately set by adjusting for example the force exerted by the spring 59 such that the coil support 8 is rotated under an appropriate frictional force.

In the elevating operation of the pickup arm, the braking force is applied to the horizontally moving means preferably immediately after a stylus of a pickup cartridge carried by the pickup arm takes off a record disc, and in the lowering movement of the pickup arm the braking force is removed from the horizontally moving means preferably just before the stylus comes into contact with the record disc.

While the invention has been disclosed in specific detail for purposes of clarity and complete disclosure, the appended claims are intended to include within their meaning all modifications and changes that come within the true scope of the invention.

What is claimed is:

1. A braking device for a pickup arm of a disc player of the type including a frame, a turntable rotatably mounted on the frame, and a pickup arm disposed on the frame for vertical and horizontal movements relative to the turntable, comprising:

horizontally moving means for controllably moving the pickup arm for the horizontal movement, having
a coil support disc
a coil supported on said support disc, and
a magnet, said coil supported on said support disc and said magnet co-operating for effecting the horizontal movement of the pickup arm;
cueing control means for controllably moving the pickup arm for the vertical movement between an upper limit position and a lower limit position where the pickup arm is in a playing mode, having
a cueing lever pivotally mounted on the frame,
drive means for rotating said cueing lever,
first cam means, rotatably mounted on the frame and rotated by said cueing lever, and
an arm lifter following said first cam means for vertical movement to move the pickup arm for the vertical movement; and
braking means being actuated and applying a braking action to the horizontal movement of the pickup arm when the pickup arm is in a non-playing mode, having
a brake lever pivotally mounted on the frame, and
a braking force applying member defined in said horizontally moving means;
said brake lever being actuated by said first cam means of the cueing control means to abut against the braking force applying member for exerting the braking force.

2. A device recited in claim 1, wherein said cueing control means further comprises:
means for detecting the upper and lower limit positions of the pickup arm to derive a detection signal; and
means for controlling said drive means of the cueing control means according to the detection signal from said detecting means,
said drive means being enabled to rotate said cueing lever when said detecting means detect the upper and lower limit positions on vertical movements of said pickup arm in upward and downward directions, respectively.

3. A device as recited in claim 2, wherein said brake lever is a two arm lever, one arm of which is biased against the first cam means, and the other arm of which is brought into contact with said coil support disc when the pickup arm is in the non-playing mode.

4. A device as recited in claim 3, further comprising a second cam means for controlling the rotation of said two arm lever, the second cam means comprising a cam member provided to the first cam means and a cam follower provided to the free end of the one arm of the two arm lever and following the cam member.

5. A device as recited in claim 4, wherein said cam member is a pin mounted on the first cam means.

6. A device as recited in claim 5, wherein said two arm lever has a bell crank shape, and wherein said cam follower is formed by bending inwardly at the free end of the one arm.

* * * * *